United States Patent [19]
Link et al.

[11] Patent Number: 5,152,041
[45] Date of Patent: Oct. 6, 1992

[54] METHOD AND APPARATUS FOR ROLLING CONTINUOUS MATERIAL

[75] Inventors: Christoph Link, Weingarten, Fed. Rep. of Germany; Eugen Schnyder, Waltenschwil; Alfred Schar, Zurich, both of Switzerland

[73] Assignee: Sulzer-Escher Wyss GmbH, Ravensburg, Fed. Rep. of Germany

[21] Appl. No.: 610,011

[22] Filed: Nov. 5, 1990

[30] Foreign Application Priority Data

Nov. 9, 1989 [CH] Switzerland ............... 04041/89

[51] Int. Cl.[5] ............................................ B21B 13/02
[52] U.S. Cl. .................................. 29/116.2; 100/170; 162/203
[58] Field of Search ............. 29/113.2, 116.2, 115; 137/861, 862, 864; 100/162 B, 163 A, 170, 176; 72/245; 162/203

[56] References Cited

U.S. PATENT DOCUMENTS

| | | | |
|---|---|---|---|
| 4,106,405 | 8/1978 | Biondetti et al. | 29/116.2 X |
| 4,625,637 | 12/1986 | Pav et al. | 29/116.2 X |
| 4,757,582 | 7/1988 | Verkasalo | 29/116.2 |
| 4,852,229 | 8/1989 | Crouse | 29/116.2 |
| 4,991,499 | 2/1991 | Kusters | 29/116.2 X |

Primary Examiner—Joseph M. Gorski
Assistant Examiner—S. Thomas Hughes
Attorney, Agent, or Firm—Sandler, Greenblum & Bernstein

[57] ABSTRACT

Apparatus and process are provided wherein pressure is exerted on a web by at least two rollers. One roller includes a roll shell which is rotatable around a stationary beam, wherein the roll shell is supported against the beam by hydraulic operational support elements on the side of the press, as well as by counterpressure elements exerting pressure in the opposite direction. A particularly rapid and safe opening of the roller device, without damaging the supporting elements or the roll shell because of detached supporting elements, is achieved because the hydraulic pressure medium from the pressure areas of at least part of the operational support elements is routed as directly as possible without detours to the pressure areas of counterpressure elements, such as by a multiple sliding valve located at the beam end.

14 Claims, 1 Drawing Sheet

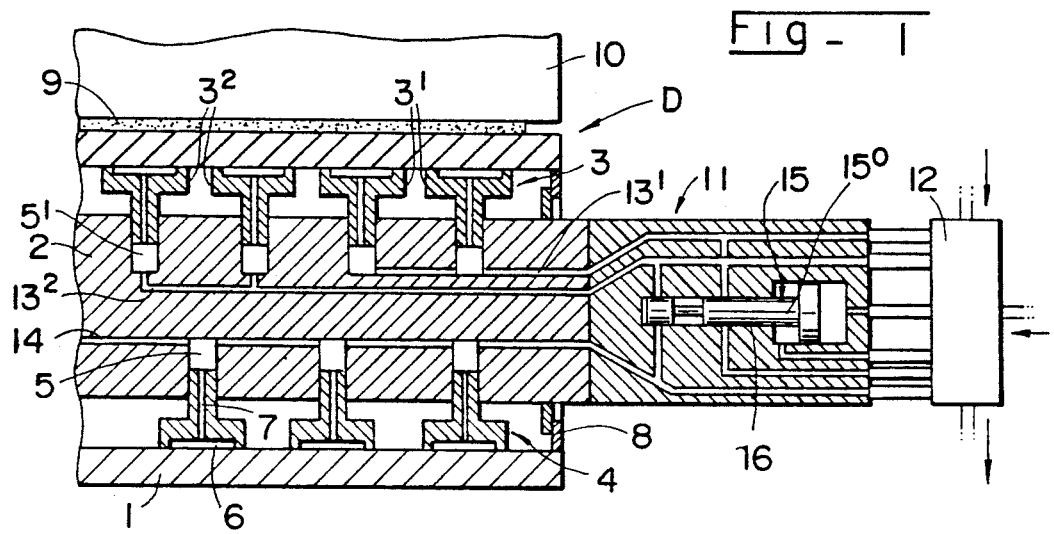
Fig-1
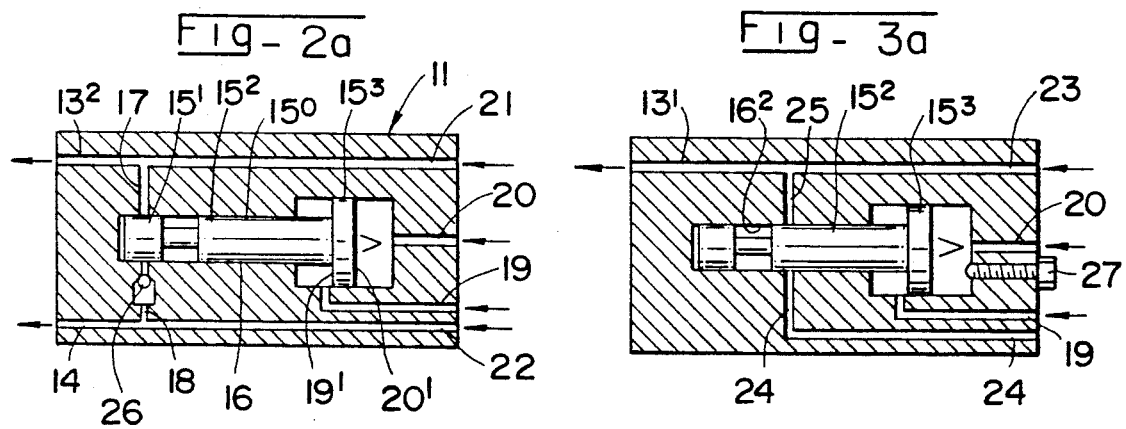
Fig-2a
Fig-2b
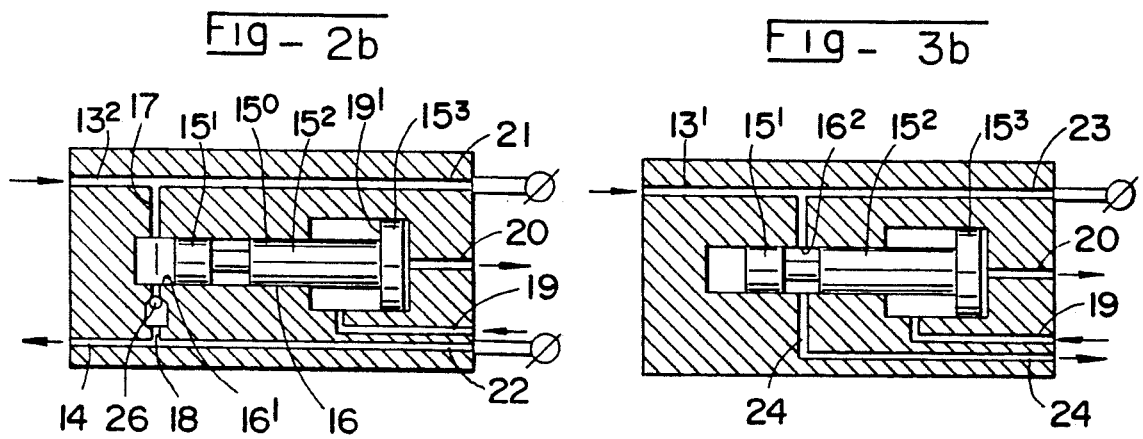
Fig-3a
Fig-3b

METHOD AND APPARATUS FOR ROLLING CONTINUOUS MATERIAL

BACKGROUND OF THE INVENTION

1. Field of the Invention

The present invention relates to a process for pressure rolling continuous material by feeding it between two rolls, which, if necessary, may be supported by additional rolls. At least one of the rolls is designed as a deflection control roll, and includes a nonrotating beam and a roll shell which is rotatable around the beam.

Between the beam and the roll shell is mounted a first row of supporting elements including at least one operational supporting element which is supplied with a hydraulic medium under controllable pressure via a pressure conduit within the beam. The operational supporting element is movably guided relative to the beam in the compression plane, and while exerting pressure in one direction, the operational support is braced against the roll shell.

A second row of supporting elements including at least one counterpressure element is located on the side of the beam that is opposite to the operational supporting elements. This second row of supporting elements can be supplied, by at least one additional pressure conduit, with a hydraulic medium under controllable pressure. The additional pressure conduit is positioned within the beam, and is independent of the operational supporting elements. The counterpressure element is movably guided relative to the beam within the compression plane, with the pressure exerted by the counterpressure element on the roll shell being in the opposite direction to the direction of support of the operational supporting elements.

Moreover, the present invention also relates to an apparatus for performing the process for pressure rolling continuous material by feeding it between two rolls.

2. Discussion of Background and Material Information

The above-discussed rolls having two rows of supporting elements arranged on opposite sides are known and we disclosed, for instance, in CH 541,088 or U.S. Pat. No. 3,802,044, the disclosures of which are incorporated by reference in their entireties. These rolls may be utilized, for example, for pressing or pressure treatment of various types of continuous materials, including textiles, metal foil, plastics and paper, cardboard or fibrous webs.

The rolls act in the compression plane in concert with at least one additional roll. In this configuration, at least one external roll, e.g., the highest or the lowest roll, is designed as a deflection control roll having a roll shell which moves freely relative to the beam in the direction of the press.

During operation of the rolling apparatus, pressure is exerted on the continuous material moving between the rolls by the force of the operational supporting elements acting within the compression plane. In this process, the beam is flexed to some degree. When the upper roll is involved, the supporting elements, which exert pressure in the opposite direction, can accept the dead weight of the roll shell. For the upper and lower rolls, the supporting elements also serve to open the roller apparatus, which may be a glazing machine as described, for example, in CH 383,087 or in DE 1,113,131 whose disclosures are incorporated by reference in their entireties.

During this process, especially for very rapid openings which take less than one second, the pressure within the pressure conduits leading to the operational supporting elements is turned off abruptly, and the roll shell is raised by the counterpressure elements. However, it frequently happens that the counterpressure elements, at least over part of the length of the roll shell, become detached from the roll shell or that the counterpressure elements cannot follow fast enough. Such a separation of the roll shell, even if very brief, is highly undesirable because the hydrostatic lubricating cushion collapses. Such collapse of the hydrostatic lubricating cushion may cause the supporting elements and the roll shell to be damaged when the supporting elements reestablish contact. This is particularly dangerous when the lubricating fluid, such as water or thermal oil, is not very effective.

Moreover, if the pressure drop for the operational supporting elements and the pressure increase for the counterpressure elements are not precisely synchronized, there is a risk that the strain on the roll shell becomes too great. This is particularly dangerous if, for instance, a valve in a pressure conduit fails. Besides, it is also necessary during the opening process to provide the supporting elements with a large amount of oil under high pressure within a relatively short time. It is particularly critical during running operations to open a connection to an accumulator while, simultaneously, keeping the operational supporting elements from being open.

SUMMARY OF THE INVENTION

It is an object of the present invention to eliminate the above-mentioned technological disadvantages and to provide a process and apparatus for rolling continuous materials with at least one deflection-control roll which allows particularly rapid separation of the roll and opening thereof without causing the counterpressure elements to become detached and without risk of damaging the supporting elements or the roll shell.

The present invention achieves this objective in such a way that, when the rolls are separated, the hydraulic medium from at least part of the operational supporting elements of the deflection-control roll is rerouted as expeditiously as possible to the counterpressure elements.

It is also an object of the present invention to provide apparatus having a pressure-control unit to which the pressure conduits of the operational supporting elements and the pressure conduits of the counterpressure elements of the deflection control roll are connected, and which includes a rechanneling device through which ——when the pressure for the operational supporting elements is turned off—— at least some of the pressure conduits of the operational supporting elements are directly connected to the pressure conduits of the counterpressure elements.

Advantage is hereby taken of the fact that the energy of the flexed beam is used directly as an energy source for pressurizing the counterpressure elements without the need to move large quantities of the pressure medium and without requiring an external pressure-medium accumulator or an increased short-term pumping capacity for this purpose. Moreover, the release of tension and the depressurizing of the operational supporting elements are automatically synchronized with pressurizing the counterpressure elements and coordinated in such a way that malfunctions are virtually eliminated.

The above-noted objects are achieved by providing an apparatus for pressure rolling continuous material by feeding the material between two rollers. This apparatus includes at least one deflection-control roll including a nonrotating beam and a roll shell, with the roll shell being rotatable around the beam; a first row of support elements including at least one operational supporting element, which is supplied with a hydraulic medium under controllable pressure via at least one pressure conduit within the beam, with the at least one operational supporting element being movably guided relative to the beam in a compression plane and, while exerting pressure in a direction of the compression plane, is braced against the roll shell; a second row of support elements including at least one counterpressure element on a side of the beam opposite the first row of support elements supplied by at least one additional pressure conduit within the beam and independently of the first row of support elements with a hydraulic medium under controllable pressure, with the at least one counterpressure element being movably guided relative to the beam within the compression plane, and in a direction opposite the direction of support provided by the first row of support elements; and means for permitting flow of the hydraulic medium from at least a portion of the first row of support elements to be rechanneled to the counterpressure elements when the rolls are being separated.

The first row of support elements may include at least two groups of operational supporting elements, with each group including at least one operational supporting element.

The means for permitting flow of the hydraulic medium may include a pressure control unit to which pressure conduits for the at least two groups of operational supporting elements and the counterpressure elements are connected, and means for rechanneling a pressure conduit associated with at least one of the at least two groups of operational supporting elements directly to a pressure conduit associated with the at least one counterpressure element when the pressure for the operational supporting elements is turned shut off. Relating to this, the means for rechanneling may include a sliding valve having a valve body which is adjustable between two extreme positions and which includes a valve path, which in one valve position establishes a connection between the pressure conduit associated with at least one of the at least two groups of operational supporting elements and the pressure conduit associated with the at least one counterpressure element, and which in another valve position blocks this connection.

The sliding valve may include a second valve path which, in one position of the sliding valve, connects the pressure conduit associated with at least one of the at least two groups of operational supporting elements, which in this position of the sliding valve are not connected to the pressure conduit associated with the at least one counterpressure element, to a pressure medium back-flow conduit, and which, in the other position of the sliding valve, blocks this connection.

The sliding valve may comprise a piston valve which can be pressurized with a pressure medium by a pumping control unit to shift the valve body between valve positions, and may include a check valve in the connection between the sliding valve and the at least one counterpressure element.

Moveover, the sliding valve may include means for limiting movement of the valve body, such as a screw.

Additionally, the means for permitting flow of the hydraulic medium may include a pumping control unit, and the pressure conduits associated with the at least two groups of operational supporting elements and the pressure conduit associated with the counterpressure elements may be connected to the pumping control unit, and can be supplied with the pressure medium by the pumping control unit synchronously with the positioning of the sliding valve in such a manner that the pressure medium supply from the pumping control unit to the pressure conduits is turned off when the valve body is in the valve position at which the valve paths are open, and that the pressure medium supplied to the pressure conduits is open when the valve body is in the other valve position at which the valve paths are blocked.

The means for rechanneling may also comprise a multiple path valve with at least three mutually connected valve pistons of which at least two valve pistons serve to open and close one valve path, and wherein an additional valve piston serves to control the valve position. Moreover, the valve body may be movable in the axial direction of the beam, and the rechanneling device may be located within a control head which is attached to one end of the beam.

The above-noted objects are also achieved by the process of feeding the material between the two rollers of the apparatus.

BRIEF DESCRIPTION OF THE DRAWING

Other characteristics, and advantages of the invention will become clear from the description which follows with reference to the annexed drawings, which are given by way of non-limiting examples only, in which:

FIG. 1 illustrates a cross-section through a roller device having a deflection-control roll and a control head;

FIGS. 2a and 2b illustrate the control head with connecting conduits for a set of operational supporting elements and counterpressure elements in the two extreme positions of its sliding valve; and FIGS. 3a and 3b illustrate the control head with connecting conduits for another set of supporting elements in the two extreme positions of its sliding valve.

In the deflection control roll D shown in FIG. 1, a roll shell 1 is mounted to be rotatable around a nonrotating beam 2 on two rows of hydrostatic supporting elements 3 and 4. The supporting elements can be designed as described in U.S. Pat. No. 3,802,044, for example, or in some other conventional manner. As shown in the embodiment illustrated in the drawings, the individual support elements can be movably guided in the direction pressure is exerted within cylindrical-shaped bores 5, $5^1$ of the beam 2, and which, on the bearing surface that faces the inside of the roll shell 1, have one or more bearing pads 6, which are connected by a throttling port 7 with the cylindrical-shaped bore area 5, $5^1$. However, other known hydrostatic supporting elements can also be used.

The roll shell 1 is sealed at its ends against the beam 2 by seals 8 which are, by way of example, designed as described in U.S. Pat. No. 3,885,283, which is hereby incorporated by reference in its entirety, which permit movement of the roll shell 1 relative to the beam 2 at least within the provided compression plane.

In the illustrated embodiment, the support elements 3 of the upper row function as operational supporting elements to press the roll shell 1 in the compression plane against a continuous material 9, e.g., a paper web to be glazed, which moves between the deflection-control roll D and a cooperating roll 10. In this instance, the supporting elements 3 of the upper row function as operational supporting elements and their direction of support is in the direction of the compression. The counterpressure elements 4 are provided on the lower side of beam 2, which is on the side opposite that of the operational supporting elements 3. The counterpressure elements 4 act independently of the operational supporting elements 3, and exert pressure on the roll shell 1 in the opposite direction to the direction of support of the operational supporting elements 3.

In a typical roller configuration, e.g., a glazing roller machine for paper webs, 30 to 50 operational supporting elements may be provided on the pressing side for a roll width between 6 to 10 meters, while in the opposite direction only 10 to 25 counterpressure elements are provided. Therefore, the force exerted in the direction of the press exceeds the force exerted by the counterpressure elements, which can only become effective when the operational supporting elements are switched off when the rolling apparatus is opened. To create pressure, the pressure areas 5, $5^1$ of the individual support and counterpresssure elements in both rows 3 and 4 are supplied with a hydraulic pressure medium with adjustable pressure by pressure conduits $13^1$, $13^2$ and 14 via a control head $11^1$ and a pumping control unit 12. To reduce installation costs, the operational supporting elements 3 are connected to the pressure conduits in groups. Whereas the drawings show only two such groups $3^1$ and $3^2$, where the adjoining supporting elements are jointly connected respectively to conduit $13^1$ or $13^2$, in practice the construction of such rolls may provide up to 8 zones, each of which may contain 3 to 6 adjoining operational supporting elements. Thus, a zoned control of pressure is possible over the entire width of the continuous material being processed. However, it is usually sufficient if the counterpressure elements 4 are connected to a single pressure conduit 14.

During normal operation, both rows of hydrostatic supporting elements 3 and 4 are usually pressurized in such a way that, in the compression plane, the force of the press directed against the adjoining roller 10 by the operational supporting elements 3 exceeds the pressure exerted in the opposite direction by the counterpressure elements 4. When the roller device is opened rapidly, the hydraulic medium pressure for the operational supporting elements 3 must be turned off at once, and the hydraulic medium from pressure areas $5^1$ must drain out of the operational supporting elements 3 very quickly in less than one second, for example, in about 0.2 seconds. At the same time, the pressure areas 5 of the counterpressure elements 4 must be supplied with additional hydraulic medium so that they can press against roll shell 1 without becoming detached from the roll shell. To accomplish this in the shortest possible time, at least part of the hydraulic medium of the operational supporting elements $3^2$ is channeled as directly as possible ——that is by using the shortest possible route and without relying on reservoirs and pumping devices—— to the pressure areas 5 of the counterpressure elements 4.

For this purpose the pressure conduits $13^1$, $13^2$, and 14 are connected to a pressure control unit 11 which has a rechanneling capability. In the illustrated example, the pressure control unit consists of a control head $11^1$ that is located at and fastened to the front end of the beam 2. The rechanneling capability is achieved via a multiple sliding valve 15, the valve body $15^0$ of which is movable between two extreme positions in the axial direction of the beam in a bore 16. The control head $11^1$ is also connected through a number of pressure conduits to a pumping control unit 12 which supplies the hydraulic medium to the separate pressure conduits for the hydrostatic support elements 3 and 4, and for resetting the valve and which, if necessary, opens the pressure medium drain.

FIGS. 2a and 2b, as well as FIGS. 3a and 3b, show in detail the construction of the multiple sliding valve 15, the connection of the various pressure conduits to the valve, and the pressure medium flow for the two extreme positions of the valve piston. For the sake of clarity, the connection of only one of the pressure conduits leading to the separate zones of operational supporting elements 3 is illustrated. In practice, however, several of the pressure conduits leading to separate zones of operational supporting elements are always connected in parallel to the group comprises those operational supporting elements 3, which in the case of a rapid opening are short-circuited by the counterpressure elements 4, and the other comprises those operational supporting elements 3 which are, if necessary, depressurized during rapid openings. For separate control of the two groups of operational supporting elements 3, the rechanneling valve 15 is designed as a multiple valve with two valve-piston segments $15^1$ and $15^2$ which, depending on the position of the valve body $15^0$, close or open two corresponding valve channels $16^1$ and $16^2$. A third piston segment $15^3$ serves to control the adjustment of the valve body between the two extreme positions.

FIG. 2a and 2b show the path of the conduits and the flow of the pressure medium for the operational supporting elements $3^2$ which are short-circuited during rapid openings by the counterpressure elements 4. During normal operation, the pressure conduits $13^2$ of the operational supporting elements $3^2$ and the pressure conduit 14 of counterpressure elements 4 are separately supplied with hydraulic pressure medium, possibly under different pressures, by the pumping control unit 12. From both pressure conduits $13^2$ and 14, branch conduits 17 and 18 lead to valve 15. However, in the operational mode of the valve, the two branch conduits 17 and 18 are closed by piston $15^1$ of the valve 15, as illustrated in FIG. 2a. The valve body in this process is kept in the operational position because the control piston segment $15^3$ is kept under pressure from both sides by the pressure medium from pressure conduits 19 and 20, whereby a stronger pressure is exerted on the backside by pressure conduit 20.

During rapid opening, however, the pressure within the pressure conduit 20 is switched off by the pumping control unit, so that now the pressure supplied by the pressure conduit 19 to the front of the control piston segment $15^3$ dominates and pushes the valve body $15^0$ abruptly to its other extreme position as shown in FIG. 2b. The piston segment $15^1$ now opens the path $16^1$ within the valve bore 16, and establishes a connection between the pressure conduits $13^2$ of the operational supporting elements $3^2$ and parallel-connected pressure conduits for other zones of operational supporting elements as well as the pressure conduit 14 for the counterpressure elements. Simultaneously, the feed conduit 21 for the pressure conduits $13^2$ and the feed conduit 22 for the pressure, conduit 14 are closed by the pumping control unit, so that now only one pressure medium flow is possible from the pressure conduit $13^2$ to the pressure conduit 14 via the valve path $16^1$. Because the beam 2 in the operational mode experiences a certain degree of flexion, the hydraulic medium in the pressure area $5^1$ of the operational supporting elements $3^2$ is subjected to a certain excess pressure. When the beam 2 springs back to its straight form, the pressure medium is very rapidly pressed from the pressure areas $5^1$——via the pressure conduits $13^2$, the valve path $16^1$ and the pressure conduit 14—— into the pressure areas 5 of the counterpressure elements 4, so that the pressure areas exert additional pressure on the roll shell 1 and push it back, whereby the counterpressure elements 4 follow without becoming detached from the roll shell 1. To this end, it is necessary to connect just the right number of operational supporting elements $3^2$ to the valve path $16^1$ needed to assure that the drained pressure medium is sufficient to refill the pressure areas 5 of the counterpressure elements 4 and to push the counterpressure elements 4 with sufficient force to keep them from becoming detached.

After the opening process has ended and after the pressure medium has shifted from the operational supporting elements $3^2$ to the counterpressure elements 4, the valve body $15^0$ is pushed back again into its other extreme position. However, the conduit $13^2$, 21, which leads to the operational supporting elements, remains unpressurized, while the counterpressure elements are resupplied constantly via conduit 14, 22, which means that they are resupplied with the hydraulic medium under specific pressure both during the operational phase as well as during the rechanneling phase.

To prevent backflow of the pressure medium from conduit 22 via the branch conduit 18 and the valve path $16^1$ to the operational supporting elements 3, a check valve 26 is positioned within the said conduit 18. Moreover, the return movement of valve body $15^0$ can be controlled herein by a position sensor, which triggers the valve to be reset as soon as the roll shell has reached a specific position.

FIGS. 3a and b show the connections of the pressure conduits and the flow of the pressure medium for those operational supporting elements $3^1$ whose pressure medium is not needed for driving the counterpressure elements during the opening process. Their pressure conduits $13^1$ in the operational mode are supplied via a conduit 23 with a hydraulic medium of controllable pressure by the pumping control unit 12 and connected via a branch conduit 25 with the control valve 15. A corresponding flow-back conduit 24 leads from the valve to the outside, if necessary, via a pressure medium reservoir. During normal operations, the valve path $16^2$ is interrupted between the branch conduit 25 and flow-back conduit 24 by the second piston segment $15^2$ of the valve. However, if during the opening process the piston control segment $15^3$ of the valve is pressurized and the valve body is pushed back, then connection is established between pressure conduit $13^1$ via the valve path $16^2$ to the flow-back conduit 24, so that the hydraulic pressure medium can drain rapidly. In this process the connecting conduit 23 is also opened. Consequently, after the opening process is completed and after the pressure medium has drained from supporting elements $3^1$ the conduit $13^1$ remains unpressurized.

The movement of the valve body 15 to the rear can be adjustably limited by a suitable device, e.g., a regulating screw 27 (shown in FIG. 3a), so that the separate valve paths can be opened as required to different degrees. Thus, the speed of the hydraulic medium displacement can be controlled and adjusted to the given requirements.

The described multiple valve renders it possible to supply the counterpressure elements in a very rapid manner, both within the shortest possible time and via the shortest possible route, with the hydraulic medium needed to push the roll shell back, whereby the elastic flexion of the beam serves as the source of energy, and to simultaneously effect the quickest possible drain of the pressure medium from the other operational supporting elements, which are not needed for supplying the counterpressure elements. In the process according to the present invention, rerouting the flow automatically synchronizes the drain of the pressure medium from the operational supporting elements while pressurizing the counterpressure elements.

In a practical application, in which 30 to 50 operational supporting elements are installed, e.g., for a lower calendar roll, and for which only about 10 to 25 counterpressure elements are needed, it suffices for an effective quick opening of the medium if only about half of the operational supporting elements are short-circuited with the counterpressure elements during the opening process, and the remaining operational supporting elements are depressurized. In a situation in which operational supporting elements are, for example, grouped and jointly driven in eight zones, then four zones of operational supporting elements may be connected in parallel to the control valve as shown in FIGS. 2a and b, while the pressure conduits of the remaining four zones may be connected in parallel to one another to the control valve as shown in FIGS. 3a and b.

While it may be sufficient for the lower roll of a calendar to short-circuit less than half of the operational supporting elements with the counterpressure elements during the opening process because of the additional effect of the weight of the roll shell, the situation for an upper roll of a calendar is exactly reversed. Here the pressure exerted by the operational supporting elements is in the direction of the rolls located below, while the counterpressure elements must also support the weight of the roll shell when the calendar is opened. This usually requires a larger number of counterpressure elements, a number which may be in the range of the operational supporting elements. Here, it may be appropriate or even necessary during a rapid opening process to short-circuit all operational supporting elements with the counterpressure elements, as shown in FIGS. 2a and b. This would mean that certain operational supporting elements are not depressurized at all in the manner illustrated in FIGS. 3a and b.

While the rechanneling device described above has been described as a sliding valve, other known types of valves may also be used; for instance, a combination of several three-way cocks which share the same axis or the movements of which are coupled with regard to one another in another manner.

The rechanneling device can also be placed within the beam itself as a separate control head, for instance, within an axial bore of the beam. While this solution shortens the length of the roll to be constructed, it also requires the machining of a large component, as compared to the relatively small and easily machined control head which is attached and fastened to the beam end.

This application is related to Swiss Application No. 04 041/89-3, whose priority is claimed, the disclosure and drawings of which are incorporated by reference thereto in their entirety.

Although the invention has been described with reference to particular means, materials and embodiments, it is to be understood that the invention is not limited to the particulars disclosed and extends to all equivalents within the scope of the claims.

What is claimed:

1. Apparatus for pressure rolling continuous material by feeding the material between two rollers, comprising:
   at least one deflection-control roll including a nonrotating beam and a roll shell, with the roll shell being rotatable around said beam;
   a first row of support elements including at least one operational supporting element, which is supplied with a hydraulic medium under controllable pressure via at least one pressure conduit within said beam, said at least one operational supporting element being movably guided relative to said beam in a compression plane and, while exerting pressure in a direction of the compression plane, is braced against said roll shell;
   a second row of support elements including at least one counterpressure element on a side of said beam opposite said first row of support elements supplied by at least one additional pressure conduit within said beam and independently of said first row of support elements with a hydraulic medium under controllable pressure, said at least one counterpressure element being movably guided relative to said beam within the compression plane, and in a direction opposite the direction of support provided by said first row of support elements; and
   means for permitting flow of the hydraulic medium from at least a portion of said first row of support elements to be rechanneled to the counterpressure elements when the rollers are being separated.

2. The apparatus for pressure rolling continuous material according to claim 1, wherein said first row of support elements includes at least two groups of operational supporting elements, with each group including at least one operational supporting element.

3. Apparatus for pressure rolling continuous material by feeding the material between two rollers, comprising:
   at least one deflection-control roll including a nonrotating beam and a roll shell, with the roll shell being rotatable around said beam;
   a first row of support elements including at least two groups of operational supporting elements, with each of said at least two groups of operational supporting elements including at least one operational supporting element, and supplied with a hydraulic medium under controllable pressure via at least one pressure conduit within said beam, said at least one operational supporting element being movably guided relative to said beam in a compression plane and, while exerting pressure in a direction of the compression plane, is braced against said roll shell;
   a second row of support elements including at least one counterpressure element on a side of said beam opposite said first row of support elements supplied by at least one additional pressure conduit within said beam and independently of said first row of support elements with a hydraulic medium under controllable pressure, said at least one counterpressure element being movably guided relative to said beam within the compression plane, and in a direction opposite the direction of support provided by said first row of support elements; and
   means for permitting flow of the hydraulic medium from at least a portion of said first row of support elements to be rechanneled to the counterpressure elements when the rollers are being separated include a pressure control unit to which pressure conduits for said at least two groups of operational supporting elements and said counterpressure elements are connected, and means for channeling a pressure conduit associated with at least one of said at least two groups of operational supporting elements directly to a pressure conduit associated with said at least one counterpressure element when the pressure for said operational supporting elements is turned off.

4. The apparatus for pressure rolling continuous material according to claim 3, wherein said means for rechanneling comprise a sliding valve having a valve body which is adjustable between two extreme positions and which includes a valve path, which in one valve position establishes a connection between said pressure conduit associated with at least one of said at least two groups of operational supporting elements and said pressure conduit associated with said at least one counterpressure element, and which in another valve position blocks this connection.

5. The apparatus for pressure rolling continuous material according to claim 4, wherein said sliding valve includes a second valve path which, in one position of said sliding valve, connects the pressure conduit associated with at least one of said at least two groups of operational supporting elements, which in this position of said sliding valve are not connected to said pressure conduit associated with said at least one counterpressure element, to a pressure medium back-flow conduit, and which, in the other position of said sliding valve, blocks this connection.

6. The apparatus for pressure rolling continuous material according to claim 4, wherein said sliding valve includes a piston valve which can be pressurized with a pressure medium by a pumping control unit to shift the valve body between valve positions.

7. The apparatus for pressure rolling continuous material according to claim 4, further including a check valve in the connection between said sliding valve and said at least one counterpressure element.

8. The apparatus for pressure rolling continuous material according to claim 4, further including a means for limiting movement of the valve body.

9. The apparatus for pressure rolling continuous material according to claim 8, wherein said means for limiting movement of the valve body comprise a screw.

10. The apparatus for pressure rolling continuous material according to claim 3, wherein said means for permitting flow of the hydraulic medium include a pumping control unit, and wherein said pressure conduits associated with said at least two groups of operational supporting elements and said pressure conduit associated with said counterpressure elements are connected to the pumping control unit, and can be supplied with the pressure medium by said pumping control unit synchronously with the positioning of said sliding valve in such a manner that the pressure medium supply from said pumping control unit to the pressure conduits is turned off when the valve body is in the valve position at which the valve paths are open, and that the pressure medium supplied to the pressure conduits is open when said valve body is in the other valve position at which said valve paths are blocked.

11. The apparatus for pressure rolling continuous material according to claim 3, wherein said means for rechanneling comprise a multiple path valve with at least three mutually connected valve pistons of which at least two valve pistons serve to open and close one valve path, and wherein an additional valve piston serves to control the valve position.

12. The apparatus for pressure rolling continuous material according to claim 11, wherein said beam has an axial direction, and said valve body is movable in the axial direction of said beam.

13. The apparatus for pressure rolling continuous material according to claim 3, wherein said rechanneling device is located within a control head which is attached to one end of said beam.

14. Process for pressure rolling continuous material comprising:

feeding the material between two rollers, with one of the two rollers comprising at least one deflection-control roll including a nonrotating beam and a roll shell, with the roll shell being rotatable around the beam;

supplying a hydraulic medium under controllable pressure via at least one pressure conduit within the beam to a first row of support elements including at least one operational supporting element to movably guide the at least one operational supporting element relative to the beam in a compression plane, while exerting pressure in a direction of the compression plane, against the roll shell;

supplying by at least one additional pressure conduit within the beam and independently of the first row of support elements a hydraulic medium under controllable pressure to a second row of support elements including at least one counterpressure element on a side of the beam opposite the first row of support elements to movably guide the at least one counterpressure element relative to the beam within the compression plane, and in a direction opposite the direction of support provided by the first row of support elements; and rechanneling hydraulic medium from at least a portion of the first row of support elements to the counterpressure elements when the rollers are being separated.

* * * * *